US008659921B2

(12) United States Patent
Buchwald et al.

(10) Patent No.: US 8,659,921 B2
(45) Date of Patent: Feb. 25, 2014

(54) POWER SUPPLY WITH A PIEZOELECTRIC TRANSFORMER AND METHOD FOR POWER CONVERSION

(75) Inventors: Randall Henry Buchwald, Pewaukee, WI (US); David Lyle, Brookfield, WI (US)

(73) Assignee: General Electric Company, Schenectady, NY (US)

( * ) Notice: Subject to any disclaimer, the term of this patent is extended or adjusted under 35 U.S.C. 154(b) by 1215 days.

(21) Appl. No.: 12/550,029

(22) Filed: Aug. 28, 2009

(65) Prior Publication Data

US 2011/0051461 A1    Mar. 3, 2011

(51) Int. Cl.
*H02M 3/24* (2006.01)
(52) U.S. Cl.
USPC ............................................. 363/75; 363/76
(58) Field of Classification Search
USPC ...................... 363/74–80, 124–126
See application file for complete search history.

(56) References Cited

U.S. PATENT DOCUMENTS

| | | | |
|---|---|---|---|
| 3,576,504 A | 4/1971 | Lopatauskas | |
| 3,657,579 A | 4/1972 | Kramer | |
| 4,510,484 A | 4/1985 | Snyder | |
| 4,595,856 A | 6/1986 | Glomb, Jr. | |
| 4,644,212 A | 2/1987 | Moritugu et al. | |
| 4,973,876 A | 11/1990 | Roberts | |
| 5,092,243 A | 3/1992 | Hawkins et al. | |
| 5,751,091 A | 5/1998 | Takahashi et al. | |
| 5,834,907 A * | 11/1998 | Takehara | 315/307 |
| 5,949,179 A | 9/1999 | Kumasaka et al. | |
| 6,016,052 A * | 1/2000 | Vaughn | 323/355 |
| 6,151,232 A | 11/2000 | Furuhashi et al. | |
| 6,738,267 B1 | 5/2004 | Navas Sabater et al. | |
| 6,794,796 B2 * | 9/2004 | Nakatsuka et al. | 310/316.01 |
| 7,005,778 B2 | 2/2006 | Pistor | |
| 7,122,939 B2 | 10/2006 | Chou et al. | |
| 7,196,475 B2 | 3/2007 | Saito et al. | |
| 7,202,592 B2 | 4/2007 | Takeda et al. | |
| 7,385,333 B2 | 6/2008 | Chou et al. | |
| 7,579,749 B2 | 8/2009 | Murata et al. | |
| 2003/0151931 A1 * | 8/2003 | Kohno | 363/22 |
| 2004/0227434 A1 | 11/2004 | Takeda et al. | |
| 2004/0232806 A1 | 11/2004 | Nakatsuka et al. | |
| 2005/0030774 A1 | 2/2005 | Vazquez Carazo | |
| 2005/0285476 A1 | 12/2005 | Chou et al. | |
| 2006/0222398 A1 | 10/2006 | Nagasaki et al. | |
| 2007/0018589 A1 | 1/2007 | Saito et al. | |
| 2008/0048524 A1 | 2/2008 | Chou et al. | |
| 2009/0195295 A1 | 8/2009 | Uematsu et al. | |

* cited by examiner

*Primary Examiner* — Jessica Han
(74) *Attorney, Agent, or Firm* — The Small Patent Law Group; Dean D. Small

(57) ABSTRACT

A power supply with a piezoelectric transformer is provided. A method for power conversion is also provided. The power supply includes a piezoelectric transformer and an oscillator circuit connected to the piezoelectric transformer. The oscillator circuit controls a sinusoidal voltage waveform at an input of the piezoelectric transformer to drive the piezoelectric transformer.

19 Claims, 4 Drawing Sheets

POWER SUPPLY WITH A PIEZOELECTRIC TRANSFORMER AND METHOD FOR POWER CONVERSION

BACKGROUND OF THE INVENTION

The subject matter disclosed herein relates generally to power supplies, and more particularly to step-up voltage converter power supplies.

Conventional voltage converter devices, particularly DC to DC converter devices, generally include switching circuits and/or charge-pumps. Additionally or alternatively, flyback inductors may be used in the voltage converter devices. These components in the converter devices create high transient currents that generate both radiated and conducted Electromagnetic Interference (EMI). As a result of the generated EMI, these converter devices are not suitable for some applications, such as magnetic field applications (e.g., Magnetic Resonance Imaging (MRI) applications) where the EMI performance can affect imaging operations and imaging quality, and therefore, are unacceptable. In other applications having low EMI requirements, including lower level signal switching applications (e.g., low noise upconverters, RF signal routing, etc.), these conventional voltage converter devices can also cause adverse affects.

Shielding and filtering are often used to reduce EMI, for example, providing shielding in connection with charge pumps. However, the shielding or filtering often has limited effectiveness and can have adverse affects in some applications, such as distorting magnetic and RF field homogeneity. Air core transformer techniques are also used. However, even with resonant primary and secondary circuits, these transformers have low efficiency and the large currents generate EMI. Other AC to DC power supplies are known that generate power outside a noise sensitive area and send the power into the noise sensitive area. However, high voltage interfaces are required in these systems, which can have electrical isolation and leakage current issues that can lead to patient safety concerns.

Power supplies providing step-up voltage conversion are also known and that include piezoelectric transformers, such as LCD backlight power supplies. However, these power supplies use high current switching and magnetic devices. These high current switching and magnetic components can have adverse affects in certain applications, for example, magnetic field applications.

BRIEF DESCRIPTION OF THE INVENTION

In accordance with one embodiment, a power supply is provided that includes a piezoelectric transformer and an oscillator circuit connected to the piezoelectric transformer. The oscillator circuit controls a sinusoidal voltage waveform at an input of the piezoelectric transformer.

In accordance with another embodiment, a low signal mode powered switching system is provided that includes a piezoelectric transformer and a feedback circuit connected to the piezoelectric transformer with the piezoelectric transformer forming part of the feedback circuit. The low signal mode powered switching system further includes an operational amplifier and phase shift network connected to an input of the piezoelectric transformer and forming a self-oscillating linear DC to DC step-converter with the feedback circuit such that the piezoelectric transformer receives a sinusoidal voltage wave input. The low signal mode powered switching system also includes a micro-electromechanical system (MEMS) switch connected to an output of the piezoelectric transformer.

In accordance with yet another embodiment, a method for power conversion is provided. The method includes generating, from a DC input signal, a sinusoidal drive signal for a piezoelectric transformer and controlling a frequency of the sinusoidal drive signal using a feedback signal from the piezoelectric transformer. The method further includes generating a DC output signal from an output of the piezoelectric transformer.

DETAILED DESCRIPTION OF THE INVENTION

Figure 1:
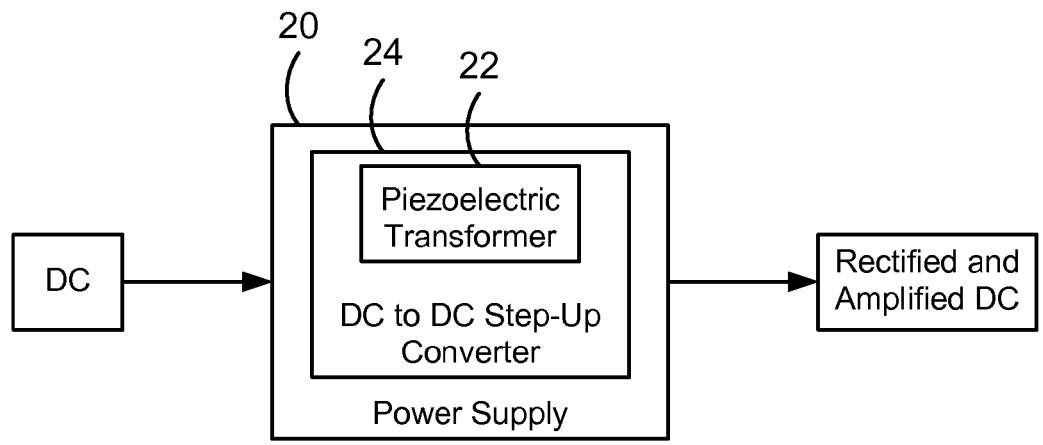
FIG. 1 is a block diagram of a power supply constructed in accordance with various embodiments.

The foregoing summary, as well as the following detailed description of certain embodiments, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks may be implemented in a single piece of hardware or multiple pieces of hardware. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments provide a power supply having a DC to DC step-up voltage converter that uses a piezotransformer device, such as a piezoelectric ceramic transformer device. Specifically, a power supply 20 as shown in FIG. 1 generally includes a DC to DC step-up voltage converter 22 (hereafter referred to as the step-up converter 22) that receives a DC input signal, which may be from an external voltage source. The step-up converter 22 includes a piezoelectric transformer 24 and uses the resonance of the piezoelectric transformer 24 for frequency control. The received DC input signal, which may be any type of direct current voltage signal (e.g., a non-rectified or rectified voltage signal), is rectified and amplified to provide a DC output signal having increased amplitude. The power supply 20 is capable of generating the rectified and amplified output signal with lowered or reduced Electromagnetic Interference (EMI), for example, to allow operation in a magnetic environment (e.g., Magnetic Resonance Imaging (MRI) system). It should be noted that additional control components, user inputs and displays may be provided as part of the power supply 20.

Figure 2:
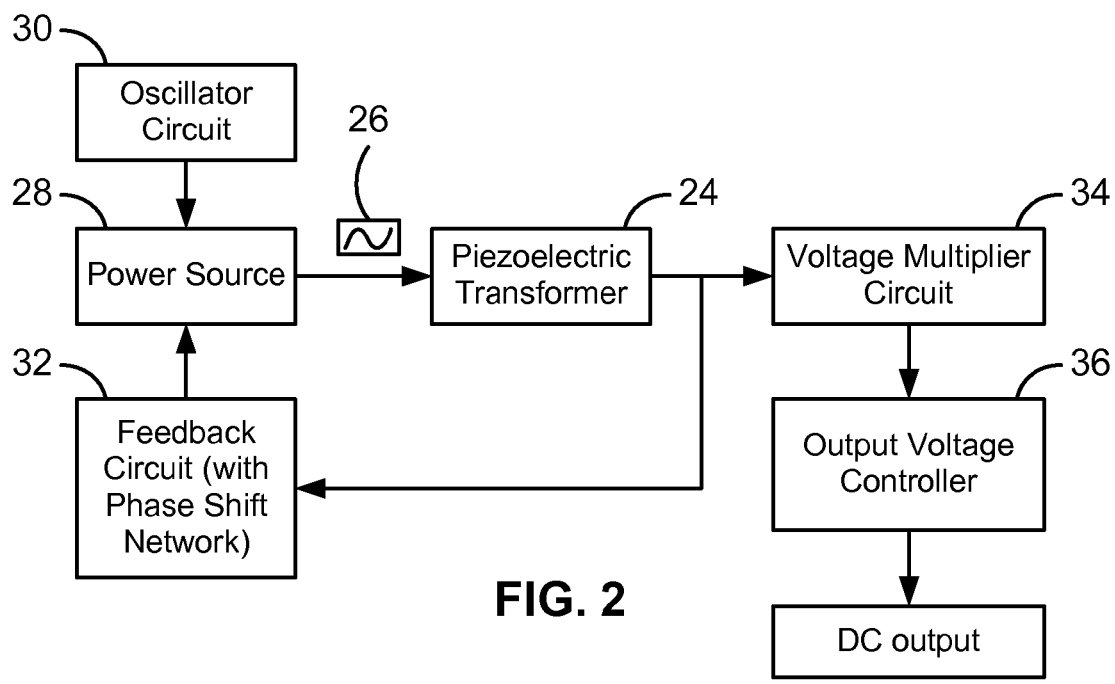
FIG. 2 is a block diagram of a DC to DC step-up converter of the power supply of FIG. 1.

The step-up converter 22, as shown in more detail in FIG. 2, includes the piezoelectric transformer 24 driven by a sinusoidal wave 26 at an input of the piezoelectric transformer 24. In various embodiments the piezoelectric transformer 24 is a piezoceramic transformer, namely a piezoelectric transformer formed from a piezoceramic material. The piezoelectric transformer 24 is connected to a power source 28, which is connected to an oscillator circuit 30. The oscillator circuit 30 controls the waveform shape of the sinusoidal wave 26 that drives the piezoelectric transformer 24. The power source 28 is also connected to a feedback circuit 32 having a phase shift network. The output of the piezoelectric transformer 24 forms part of the feedback circuit 32 such that the power supply 20 operates at the frequency of the piezoelectric transformer 24 (instead of a separate oscillator). Accordingly, self-oscillating linear voltage conversion may be provided using the piezoelectric transformer 24 with the feedback circuit 32 for frequency control. For example, the power supply 20 may operate at a low frequency, such as 150 kHz or 180 kHz. However, other operating frequencies are contemplated above or below these values, such as based on the particular application or operating requirements.

The output of the piezoelectric transformer 24 is also connected to a voltage multiplier circuit 34. An output voltage controller 36 is connected to the output of the voltage multiplier circuit 34. In operation, the output signal from the piezoelectric transformer 24 is sinusoidal before rectification and regulation. In particular, the voltage multiplier circuit 34 increases, for example, doubles or triples the voltage when configured as a doubler circuit or tripler circuit, respectively, and rectifies the output signal from the piezoelectric transformer 24. The voltage multiplier circuit 34 essentially changes an AC voltage into a higher or increased DC voltage. In the some embodiments, the voltage multiplier circuit 34 is a passive network requiring no additional power. Thereafter, in operation, the rectified and amplified signal is voltage controlled or limited by the output voltage controller 36, for example, to limit the output voltage level based on the particular application, requirements or characteristics of a connected device, etc. Thus, the power supply 20 provides voltage step-up conversion of an input DC signal to a constant DC output signal using a self-oscillating configuration that uses a sinusoidal drive wave.

Figure 3:
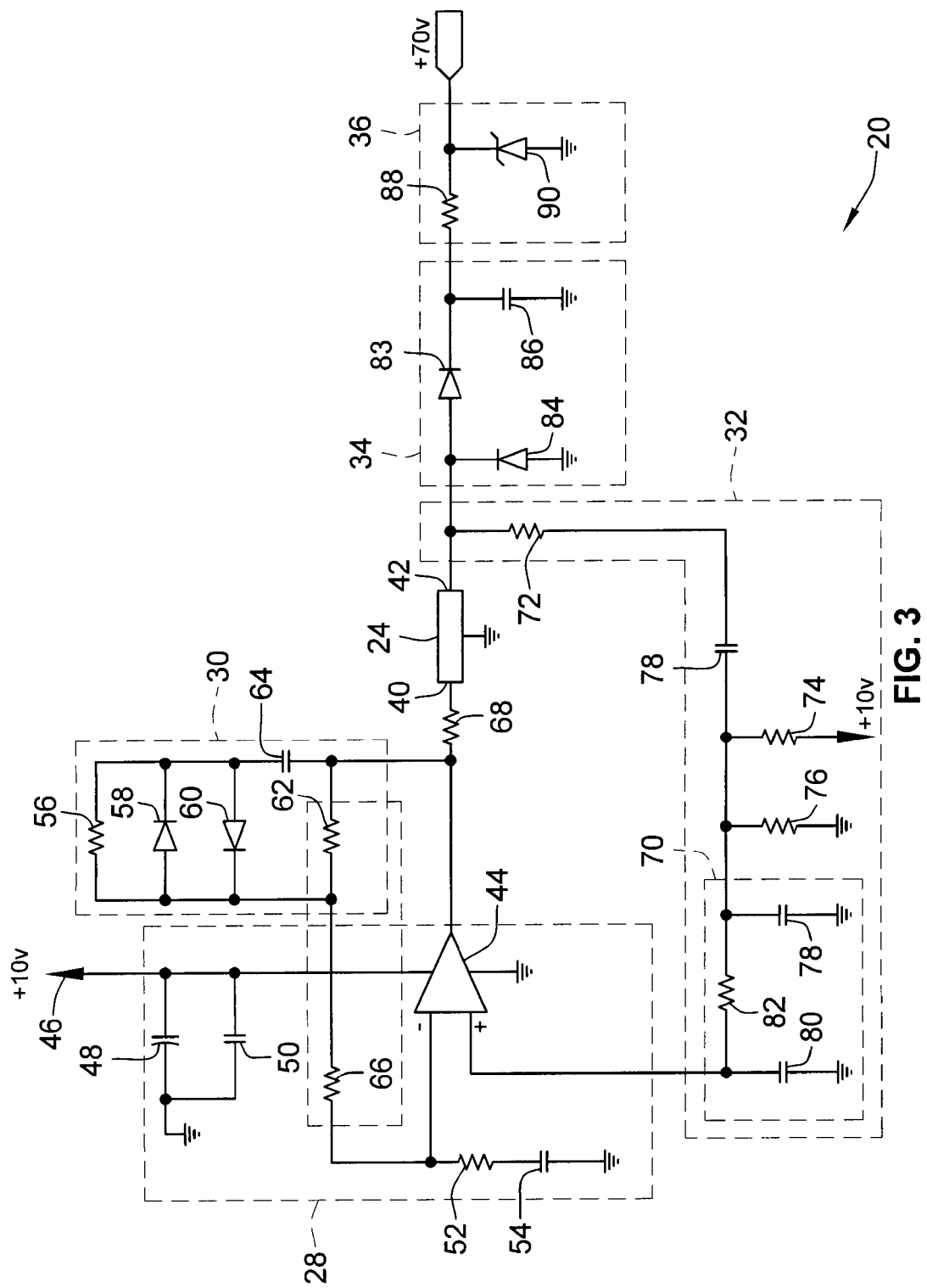
FIG. 3 is a schematic diagram of a power supply constructed in accordance with various embodiments.

A schematic diagram of the power supply 20 is shown in FIG. 3. The power supply 20 includes the piezoelectric transformer 24, which in this embodiment is formed from a piezoceramic material. Accordingly, a piezoceramic transformer element is provided that has a resonance frequency determined by the geometry of the piezoceramic material. For example, the piezoelectric transformer 24 may be a piezoelectric ceramic transformer available from Tamura Corporation of Tokyo, Japan. The piezoelectric transformer 24 includes an input 40 and output 42, which may be electrodes. The piezoceramic material propagates mechanical energy from the input 40 to the output 42, which is converted to amplified electrical energy as is known.

The power source 28 of the power supply 20, which is connected to the piezoelectric transformer 24 generally includes an operational amplifier 44 that is connected to a voltage supply 46 (e.g., a voltage rail), such as a +10 volt voltage supply as illustrated in FIG. 3. However, it should be noted that different voltage supplies may be provided as desired or needed to have different voltage and current levels. A pair of decoupling capacitors 48 and 50 (C1 and C2) is connected between the voltage supply 46 and the operational amplifier 44 to provide coupling of the DC voltage to the operational amplifier 44. The power source 28 also include a series combination of a resistor (R1) 52 and capacitor (C4) 54 connecting a negative input of the operational amplifier 44 to ground. The values of the series combination of the resistor 52 and capacitor 54 are selected to be approximately equal to the impedance of the negative input of the operational amplifier 44.

It should be noted the values of the components shown in FIG. 3 are merely exemplary and may be modified as desired or needed, for example, based on the desired voltage level to drive the operational amplifier 44, output voltage requirements, piezoelectric transformer operating parameters, etc. For example, the resistor 52 may have a value of 7K instead of 1K.

The negative input of the operational amplifier 44 is also connected to the oscillator circuit 30. The oscillator circuit 30 includes a parallel connected combination of a resistor (R3) 56, a pair of diodes 58 and 60 (D1 and D2) and a resistor 62 (R4). The parallel connected combination is connected in series with a capacitor (C3) 64, which together are connected through a resistor (R2) 66 of the power source 28 to the negative input of the operational amplifier 44.

In operation, the oscillator circuit 30 provides diode clipping to control the gain to the operational amplifier 44, as well as to keep the power source 28 generating the sinusoidal wave 26 to drive the piezoelectric transformer 24. The oscillator circuit 30 maintains the sinusoidal mode of operation of the power source 28, as well as controlling the bandwidth/gain of the amplifier stage formed from the power source 28 and piezoelectric transformer 24. In various embodiments, the oscillator circuit 30 ensures that the output of the power source 28 is not driven to a square wave output with the combination of the resistor 66 of the power source 28 and the resistor 62 of the oscillator circuit 30 controlling the wave shape of the power source 28 as sinusoidal. In the illustrated embodiment, the power source 28 generates from the 10 volt voltage supply 46, a +/−5 volt (or optionally a +/−4 volt) sinusoidal waveform at the output of the operational amplifier 44 that drives the piezoelectric transformer 24 through a resistor (R5) 68.

It should be noted that variations and modification to the oscillator circuit 30 are contemplated. For example, the oscillator circuit 30 may include a field-effect transistor (FET) together with a rectifier diode and a resistor-capacitor (RC) network to provide an automatic gain control circuit to maintain the sinusoidal wave to drive the piezoelectric transformer 24. In general, different circuits or circuit configurations may be provided as desired or needed such that the sinusoidal operation is maintained.

The output of the piezoelectric transformer 24, which includes sinusoidal currents, is connected to the feedback circuit 32 that includes a phase shift network 70. In particular, in the feedback circuit 32, a voltage divider is formed from a resistor (R9) 72 connected to a parallel combination of a resistor (R8) 74 and a resistor (R9) 76 through a capacitor (C7) 78, which operates as a blocking capacitor. The resistor 74 is connected to the voltage supply 46 (illustrated as a 10 volt voltage supply) and the resistor 76 is connected to ground. In operation, the voltage divider biases the positive input of the operational amplifier 44 at approximately 5 volts.

The feedback circuit 32 also includes the phase shift network 70, which includes a pair of parallel connected capacitors 78 and 80 (C6 and C5), each connected to ground, and having a resistor (R6) 82 connected therebetween. Accordingly, the pair of capacitors 78 and 80 is in parallel combination with the pair of resistors 74 and 76. The phase shift network 70 maintains the proper phase feedback at the positive input of the operational amplifier 44, which is generated from the output of the piezoelectric transformer 24, namely maintaining the same phase. Accordingly, in operation, the phase of the signal at the input 40 of the piezoelectric transformer 24 is constant. In operation, the output of the piezoelectric transformer 24 is an amplitude increased sinusoidal waveform. For example, in some embodiments, a +/−5 volts sinusoidal voltage wave at the input 40 of the piezoelectric transformer 24 is propagated therethrough and generates a +/−50 volts or +/−100 volts sinusoidal voltage wave at the output 42 of the piezoelectric transformer 24. The voltage increase is determined by the geometry of the piezoelectric transformer 24 as is known.

The output of the piezoelectric transformer 24 is also connected to a voltage multiplier circuit 34. The voltage multiplier circuit 34 is configured in the illustrated embodiment as a voltage doubler that increases the amplitude of the sinusoidal voltage wave by two and rectifies the sinusoidal voltage wave. The voltage multiplier circuit 34 includes a diode (D4) 83 connected to the parallel combination of a diode (D3) 84 and a capacitor (C8) 86. In operation, and continuing with the example above, the +/−50 volts or +/−100 volts sinusoidal voltage wave at the output 42 of the piezoelectric transformer 24 is doubled to +/−100 volts or +/−200 volts respectively, and then rectified, for example, half-wave or full wave rectified to generated a positive sinusoidal waveform, such a 0 to +100 volts or 0 to +200 rectified signal. The voltage multiplier circuit 34 may be modified in other embodiments to generate signals having different levels of amplification, for example, more or less than two times.

It should be noted that although the components illustrated in FIG. 3 are shown as a particular type, different types of components may be used. For example, although the diodes 83 and 84 are illustrated as Schottky diodes, different non-Schottky types of diodes may be used. Also, for example, the piezoelectric transformer 24 may be any type of piezoelectric transformer element that provides desired and/or required propagation and gain characteristics.

The output of the voltage multiplier circuit 34 is connected to the output voltage controller 36, which includes a resistor (R10) 88 connected to a diode (D5) 90. The resistor 88 is connected between the parallel combination of the capacitor 86 of the voltage multiplier circuit 34 and the diode 90. It should be noted that although the diode 90 is illustrated as a Zener diode, other types of non-Zener diodes may be used. In operation, the output voltage controller 36 limits the DC voltage level output from the power supply 20. For example, continuing with the example above, the 0 to +100 volts or 0 to +200 volts rectified signal from the voltage multiplier circuit 34 may be limited to approximately 70 volts. However, the values of the components may be modified to generate a higher or lower voltage output signal, for example, a 100 volts output. The output voltage controller 36 essentially shunts or clips the output voltage and sets the current limit.

In operation of the power supply 20, and in various embodiments, the piezoelectric transformer 24 provides 270 degrees of phase lag, as well as a ten times voltage increase. The combination of resistors 82 (R6), 76 (R7), 74 (R8) and 72 (R9) and the capacitors 80 (C5), 78 (C6) and 78 (C7) provide an additional 90 degrees of phase lag. Further, resistors 52 (R1), 66 (R2) and 62 (R4) set the initial gain of the operational amplifier 44, which in the illustrated embodiment is set to 11. Once oscillation begins, capacitor 64 (C3), diodes 58 (D1) and 60 (D2), and resistor 56 (R3) reduce the gain (slightly) to reduce distortion to diodes 84 (D3), 8284 (D3), 83 (D4) and 90 (D5) and associated components that provide further rectification and regulation as described above.

Figure 4:
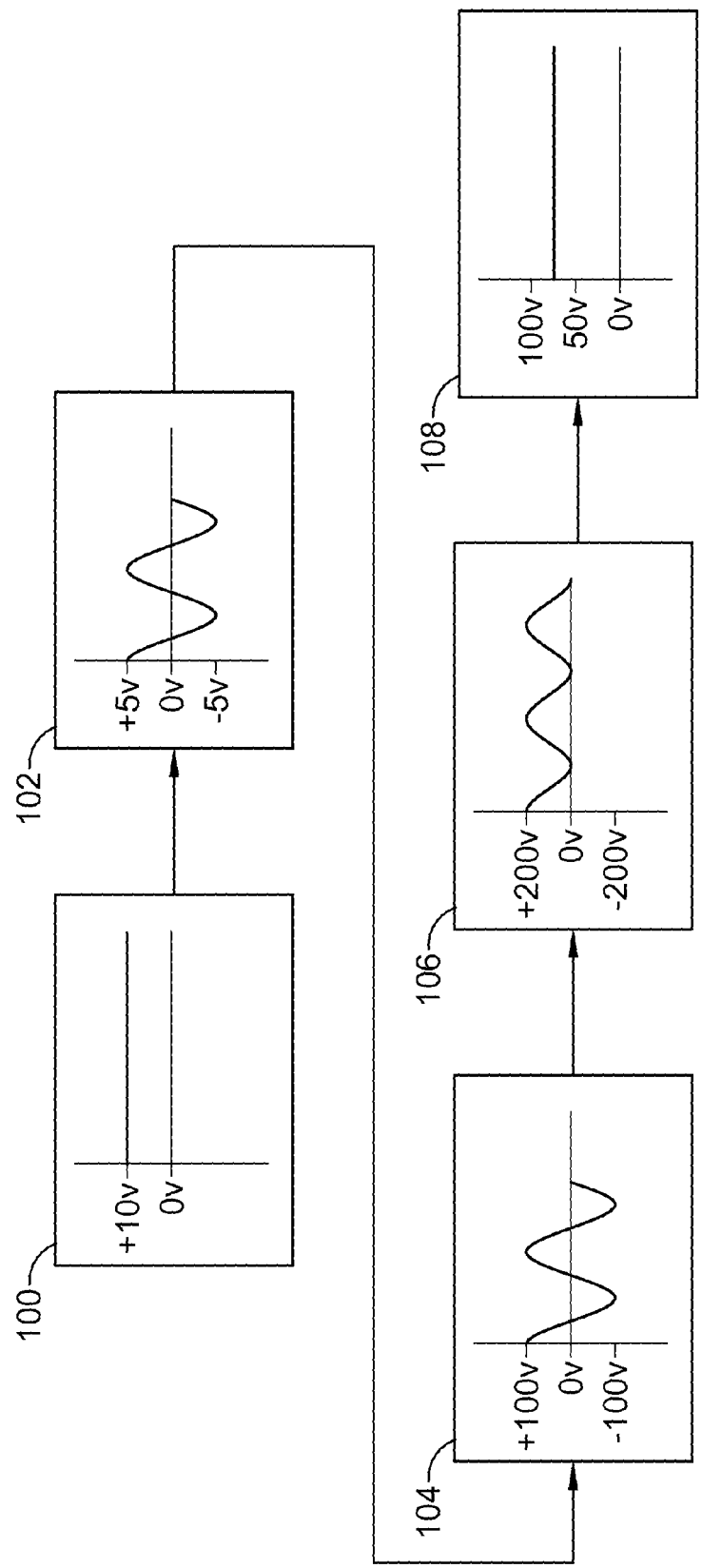
FIG. 4 is a block diagram illustrating voltage signal conversion in the power supply of FIG. 3.

FIG. 4 illustrates voltage signal conversion in the power supply 20. Specifically, the power supply 20 receives from the power source 28 (e.g., an external voltage supply) a constant DC voltage, for example, a constant DC voltage of +10 volts as shown at 100. A sinusoidal voltage wave is then generated for driving the piezoelectric transformer 24 (shown in FIG. 3) as shown at 102. For example, a +/−5 volts self-oscillating sinusoidal voltage waveform is generated and then amplified as shown at 104. As the waveform shown at 102 propagates through the piezoelectric transformer 24 the voltage waveform is amplified to a +/−100 volts sinusoidal waveform. The waveform is then rectified and amplified as shown at 106. For example, the +/−100 volts sinusoidal waveform is half-wave rectified or full-wave rectified and the amplitude doubled to a 0 volt to 200 volt voltage waveform. The output signal from the power supply 20 is then limited as shown at 108. For example, the 0 volt to 200 volt voltage waveform is limited to a +70 volts constant DC voltage. It should be noted that the frequency and amplitude of the waveforms illustrated in FIG. 4 are merely exemplary.

Figure 5:
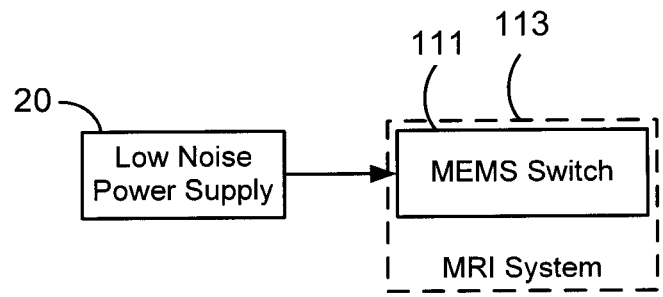
FIG. 5 is a block diagram illustrating a system implemented in connection with a power supply constructed in accordance with various embodiments.

In various embodiments, the power supply 20 operates to provide low noise operation when performing power conversion. For example, as shown in FIG. 5, the power supply 20 may be connected to a Micro-Electromechanical System (MEMS) switch 110 for generating a low noise power signal to switch the MEMS switch 110. The MEMS switch 110 may form part of an MRI system 112, for example, configured as a decoupling switch in surface coils for the MRI system 112 as described in co-pending U.S. patent application Ser. No. 12/551,374, which is entitled "Switching Device for Magnetic Resonance Coil Decoupling and Method of Switching" and is commonly owned. The power supply 20 is capable of operating in the magnetic field environment of the MRI system 112 and any EMI generated by the power supply 20 has minimal if any affect on the operation of the MRI system 112. However, the power supply 20 may be used in different applications, for example, in applications where low noise operation is desired or needed.

Figure 6:
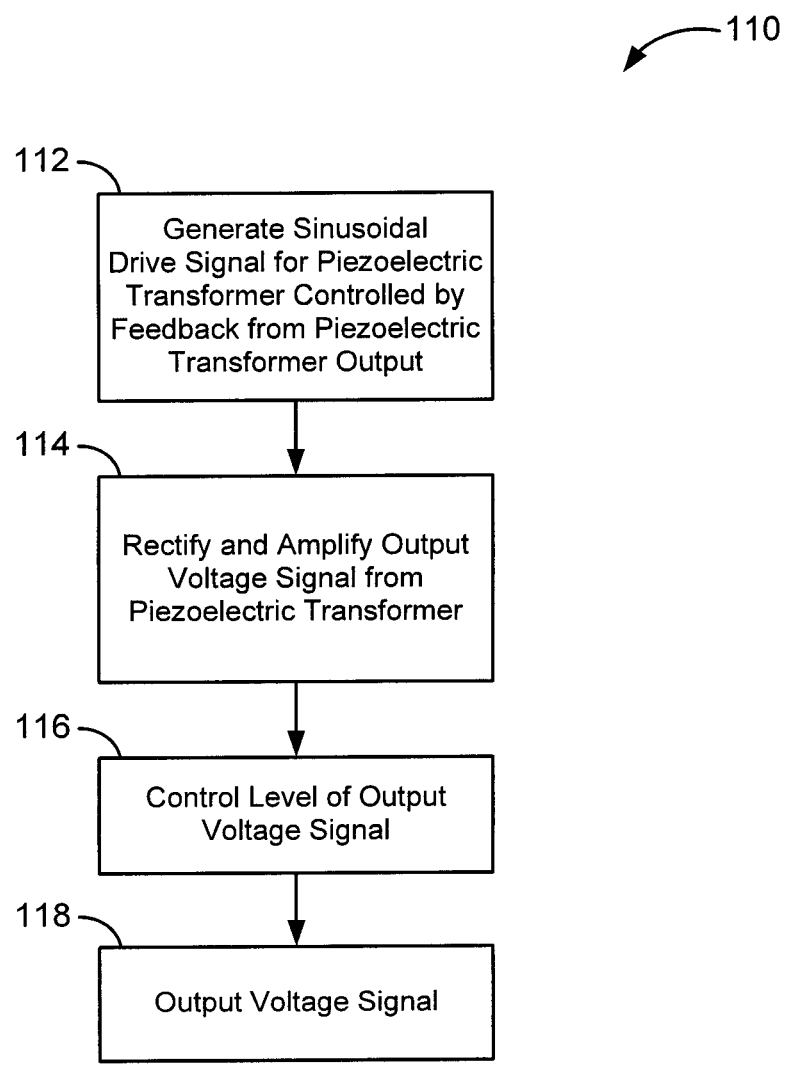
FIG. 6 is a flowchart of a method for voltage conversion in accordance with various embodiments.

Thus, various embodiments provide a power supply that is tolerant of high magnetic fields and generates low emissions, and in particular, low EMI emissions. A method 110 also may be provided to step-up convert a voltage using a power supply as illustrated in FIG. 6. Specifically, at 112 a sinusoidal drive signal for driving a piezoelectric transformer is generated. In particular, using feedback from the piezoelectric transformer, which may be a piezoelectric ceramic transformer, the sinusoidal voltage wave signal is controlled using the resonance frequency of the piezoelectric transformer, thereby forming a self-oscillating configuration. The shape of the sinusoidal voltage wave signal is controlled such that that the waveform is not driven to a square wave.

Once driven, the piezoelectric transformer propagates the sinusoidal input wave and outputs an amplified sinusoidal wave signal, which is then rectified and amplified at 114. For example, the amplitude of the sinusoidal wave output signal from the piezoelectric transformer is increased by a factor (e.g., a factor of 2) and then rectified, such as full-wave rectified or half-wave rectified to generate a positive voltage varying signal. The rectified and amplified signal is then controlled, and in particular, a level of an output signal is controlled, for example, shunted or clipped to a constant voltage signal. For example, the voltage may be limited to 70 volts DC and the current limited, for example, to a few nano-amps (e.g., less than five nano-amps). A low current constant DC voltage is then output as a voltage signal at 118.

Thus, in a power supply of the various embodiments a sinusoidal voltage wave drives a piezoelectric transformer to generate a linear DC to DC step-up conversion. The piezoelectric transformer includes feedback to provide self-oscillating frequency control such that self-optimizing oscillation results at the resonant frequency of the piezoelectric transformer. Accordingly, a power supply operating in a small signal mode with reduced or minimal EMI may be provided.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A power supply comprising:
   a piezoelectric transformer;
   a feedback circuit connected to the piezoelectric transformer and configured to control the power supply to operate at a frequency of the piezoelectric transformer;
   an oscillator circuit connected to the piezoelectric transformer, the oscillator circuit controlling a sinusoidal voltage waveform at an input of the piezoelectric transformer; and
   a phase shift network connected between an output of the piezoelectric transformer and an operational amplifier connected to an input of the piezoelectric transformer.

2. A power supply in accordance with claim 1 further comprising an operational amplifier and phase shift network connected to the oscillator circuit to form a self-oscillating linear DC to DC step-up converter.

3. A power supply in accordance with claim 1 wherein the feedback circuit comprises a phase shifter, and the piezoelectric transformer forms part of the feedback circuit.

4. A power supply in accordance with claim 1 wherein the piezoelectric transformer comprises a piezoceramic material.

5. A power supply in accordance with claim 1 further comprising a voltage multiplier circuit at an output of the piezoelectric transformer generating a rectified and amplified DC signal from the output of the piezoelectric transformer.

6. A power supply in accordance with claim 1 further comprising an operational amplifier connected to the input of the piezoelectric transformer to provide the sinusoidal voltage wave form at a constant voltage and oscillating at a frequency of the piezoelectric transformer.

7. A power supply in accordance with claim 1 further comprising an output voltage controller configured to generate a constant voltage output signal at a set level.

8. A power supply in accordance with claim 1 further comprising an operational amplifier receiving a voltage signal to generate the sinusoidal voltage wave form, wherein the voltage signal is not more than ten volts.

9. A power supply in accordance with claim 1 wherein the oscillator network comprises a pair of clipping diodes.

10. A power supply in accordance with claim 1 further comprising a voltage divider connected to an output of the piezoelectric transformer for generating a feedback signal to control oscillation of the sinusoidal voltage wave form.

11. A low signal mode powered switching system comprising:
    a piezoelectric transformer;
    a feedback circuit connected to the piezoelectric transformer with the piezoelectric transformer forming part of the feedback circuit;
    an operational amplifier and phase shift network connected to an input of the piezoelectric transformer and forming a self-oscillating linear DC to DC step-converter with the feedback circuit such that the piezoelectric transformer receives a sinusoidal voltage wave input; and
    a micro-electromechanical system (MEMS) switch connected to an output of the piezoelectric transformer.

12. A low signal mode powered switching system in accordance with claim 11 wherein the operational amplifier receives at an input 10 volts to generate a +/−5 volts output sinusoidal voltage wave and wherein the piezoelectric transformer generates from the +/−5 volts output sinusoidal voltage wave a +/−100 volts sinusoidal voltage wave.

13. A low signal mode powered switching system in accordance with claim 11 further comprising an oscillator circuit controlling a wave shape of the sinusoidal voltage wave input.

14. A low signal mode powered switching system in accordance with claim 11 further comprising an oscillator circuit preventing the wave shape of the sinusoidal voltage wave input from becoming a square wave shape.

15. A low signal mode powered switching system in accordance with claim 11 wherein the piezoelectric transformer comprises a piezoceramic material.

16. A method for power conversion, the method comprising:
    generating, from a DC input signal, a sinusoidal drive signal for a piezoelectric transformer;
    controlling a frequency of the sinusoidal drive signal to a power source using a feedback signal from the piezoelectric transformer to operate the power source at a frequency of the piezoelectric transformer;
    generating a DC output signal from an output of the piezoelectric transformer; and connecting a phase shift network between an output of the piezoelectric transformer and an operational amplifier connected to an input of the piezoelectric transformer.

17. A method in accordance with claim 16 further comprising rectifying and amplifying the output signal from the piezoelectric transformer.

18. A method in accordance with claim 16 further comprising limiting a voltage level of the output of the piezoelectric transformer.

19. A method in accordance with claim 16 further comprising controlling a waveform of the sinusoidal drive signal to maintain the sinusoidal wave shape of the signal and prevent a square wave shape.

* * * * *